(12) United States Patent
Santoro

(10) Patent No.: US 12,053,121 B2
(45) Date of Patent: Aug. 6, 2024

(54) HAND MIXER SUPPORT

(71) Applicant: Maria Antoinette Santoro, Raleigh, NC (US)

(72) Inventor: Maria Antoinette Santoro, Raleigh, NC (US)

( * ) Notice: Subject to any disclaimer, the term of this patent is extended or adjusted under 35 U.S.C. 154(b) by 280 days.

(21) Appl. No.: 17/505,036

(22) Filed: Oct. 19, 2021

(65) Prior Publication Data

US 2023/0118620 A1   Apr. 20, 2023

(51) Int. Cl.
*A47J 43/044* (2006.01)

(52) U.S. Cl.
CPC .... *A47J 43/044* (2013.01); *A47J 2043/04418* (2013.01); *A47J 2043/04445* (2013.01)

(58) Field of Classification Search
CPC ............ A47J 43/044; A47J 2043/04418; A47J 2043/04445; A47J 43/0705
USPC ....... 248/505, 693, 317, 320, 323, 327, 339, 248/340, 322, 328
See application file for complete search history.

(56) References Cited

U.S. PATENT DOCUMENTS

| | | | | |
|---|---|---|---|---|
| 1,290,433 A * | 1/1919 | Walker | ................... | A47F 5/0006 |
| | | | | 248/690 |
| 3,188,130 A * | 6/1965 | Pietrowicz | ............... | A22B 5/06 |
| | | | | D22/199 |
| 4,022,412 A * | 5/1977 | Houlf | ....................... | A47J 45/02 |
| | | | | 248/316.4 |
| 4,159,792 A * | 7/1979 | Siegal | ................. | A41D 19/0041 |
| | | | | 224/267 |
| 4,253,544 A * | 3/1981 | Dalmaso | ................. | A62B 35/04 |
| | | | | 182/18 |
| 4,550,800 A * | 11/1985 | Dietrich | .................. | B62B 3/144 |
| | | | | 280/33.993 |
| 4,865,239 A * | 9/1989 | Timbrook | .................. | A45F 5/00 |
| | | | | 224/267 |
| 5,351,346 A * | 10/1994 | Hodges, Jr. | ............. | A47K 3/281 |
| | | | | 224/220 |
| 5,531,494 A * | 7/1996 | Singleton | .................. | B62K 9/00 |
| | | | | 74/551.8 |
| 5,779,068 A * | 7/1998 | Whiten | .................. | A47F 5/0892 |
| | | | | 108/107 |
| 6,168,128 B1 * | 1/2001 | King | ...................... | A47B 37/04 |
| | | | | 248/500 |
| 6,416,026 B1 * | 7/2002 | Porraro | .................. | A47F 7/0078 |
| | | | | 248/315 |
| 6,434,800 B1 * | 8/2002 | James | ..................... | A63B 60/62 |
| | | | | 24/298 |

(Continued)

FOREIGN PATENT DOCUMENTS

FR    2493692 A1    11/1980
JP    H0724238 U  *  5/1995

OTHER PUBLICATIONS

Eitan Bermath, How to make a DIY stand Mixer, Nov. 11, 2021, https://www.facebook.com/eitanbermath/videos/how-to-make-a-diy-stand-mixer/192261262991044/, 5 minute crafts video shown within this video of hand mixer hanging from strap knot attached to cabinet knob shown at beginning of video. (Year: 2021).*

*Primary Examiner* — Kimberly T Wood
(74) *Attorney, Agent, or Firm* — James G Passe; Passe Intellectual Property, LLC

(57) ABSTRACT

By attaching a rigid device between an overhead cabinet knob with the opposite side of the rigid device being attached to the handle of the hand mixer, hands free use of the hand mixer is achieved.

3 Claims, 1 Drawing Sheet

(56) References Cited

U.S. PATENT DOCUMENTS

| | | | | |
|---|---|---|---|---|
| 6,530,131 B1* | 3/2003 | Hopkins | ............... | A45F 5/00 |
| | | | | 24/301 |
| 6,868,589 B2* | 3/2005 | Borne | ............... | F16G 11/143 |
| | | | | 24/298 |
| 7,020,935 B2* | 4/2006 | Behn | ............... | A45F 5/00 |
| | | | | 24/3.13 |
| 7,845,609 B2* | 12/2010 | Bernard | ............... | G09F 7/18 |
| | | | | 248/342 |
| 9,623,806 B2* | 4/2017 | Rodriguez | ............... | B60R 7/043 |
| 10,744,393 B2* | 8/2020 | Duch | ............... | A63B 71/143 |
| 11,510,482 B2* | 11/2022 | Holland | ............... | A45F 5/00 |
| 2005/0067549 A1* | 3/2005 | Kintzele | ............... | F16G 11/14 |
| | | | | 248/693 |
| 2005/0081798 A1* | 4/2005 | Munroe | ............... | A01K 27/003 |
| | | | | 119/795 |
| 2007/0170335 A1* | 7/2007 | Chavollo | ............... | A47B 77/14 |
| | | | | 248/328 |
| 2008/0073948 A1* | 3/2008 | Livingston | ............... | A45C 13/30 |
| | | | | 297/188.2 |
| 2008/0093871 A1* | 4/2008 | Holdbrooks | ............... | A47G 21/00 |
| | | | | 294/99.2 |
| 2008/0135711 A1* | 6/2008 | Bunting | ............... | A47F 10/06 |
| | | | | 206/553 |
| 2011/0049203 A1* | 3/2011 | Stark | ............... | A45C 13/38 |
| | | | | 224/268 |
| 2011/0248057 A1* | 10/2011 | Schmitz | ............... | A45C 13/30 |
| | | | | 294/142 |
| 2015/0021369 A1* | 1/2015 | Lehtonen | ............... | B60R 7/043 |
| | | | | 224/275 |
| 2017/0284594 A1* | 10/2017 | Angelastro | ............... | A47F 7/0021 |

* cited by examiner

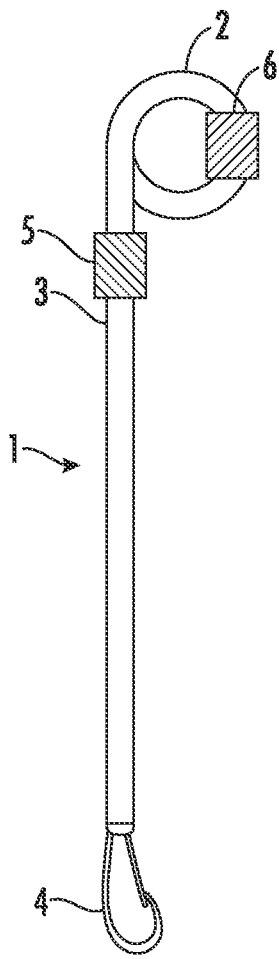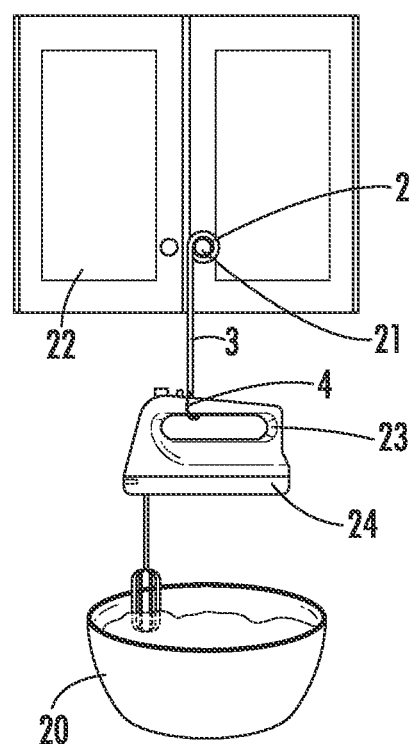
FIG. 1
FIG. 2

HAND MIXER SUPPORT

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to a device for supporting a hand mixer during use. In particular, it relates to a device that attaches to the hand mixer at one end and can hang on a cabinet door knob, or the like, located above the mixer.

Description of Related Art

The modern kitchen these days usually has at least one of a stand mixer or a hand mixer. A hand mixer is an electric mixing device that is portable, but typically still plugs into an outlet similar to a stand mixer. The hand mixer has a top handle and is much easier to use than a stand mixer, which is larger and usually not portable. In addition, hand mixers are usually half the cost or less than a corresponding stand mixer.

An advantage of stand mixers is that it leaves both of the user's hands free for adding more ingredients, scraping the bowl, and the like. A hand mixer, while portable and easy to handle, requires at least one hand to be occupied in order to hold the hand mixer. While there is at least one device that turns a hand mixer into a stand mixer, it eliminates the advantages of the hand mixer and the cost is similar to that of a stand mixer.

BRIEF SUMMARY OF THE INVENTION

The present invention relates to a device for making a hand mixer hands-free. In particular, it relates to a device which attaches to the handle of a hand mixer and allows it to be hung or attached to an overhead device in order to use it hands-free.

Accordingly, in one embodiment, there is a device for making a hand mixer having a handle, hands-free comprising:
a) an elongated device having a first end adapted to attach to the handle of the hand mixer and;
b) a second end adapted to attach or hang from an overhead device.

BRIEF DESCRIPTION OF THE DRAWINGS

FIG. 1 is a perspective view of an embodiment of the present invention.

FIG. 2 is a perspective view of the present invention being used to hold a hand mixer while being hung on a cabinet knob.

DETAILED DESCRIPTION OF THE INVENTION

While this invention is susceptible to embodiment in many different forms, there is shown in the drawings, and will herein be described in detail, specific embodiments with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention.

Definitions

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", "an embodiment", or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B, or C" means any of the following: "A; B; C; A and B; A and C; B and C; A, B, and C". An exception to this definition will occur only when a combination of elements, functions, steps, or acts are in some way inherently mutually exclusive.

The drawings featured in the figures are for the purpose of illustrating certain convenient embodiments of the present invention and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein, and use of the term "means" is not intended to be limiting.

As used herein, the term "hand mixer" refers to a portable hand mixer (handheld mixer), which is an electric mixing and blending tool that has two removable metal beaters, a top handle, and variable speeds. Some models also have additional accessories, such as a whisk.

As used herein, the term "hands-free" refers to using the elongated device of the present invention to attach to the handle of the hand mixer and hang or attach it to an overhead cabinet knob, or the like, for the purpose of having both hands free while using the mixer.

As used herein, the term "elongated device" refers to the device being long enough to reach from the handle of the hand mixer to an overhead device. It can be thin or thick, and can be made of any material such as plastic or metal. It has a first end for attaching to the handle of the hand mixer and a second end adapted to attach or hang from an overhead device. The connecting device is any device for connecting overhead or connecting to the mixer and can consist of a clip, loop, hook and loop fastener, adjustable loop, hooks, tying, and the like. In one embodiment, the elongated device is length adjustable (e.g., telescoping elongated device). In one embodiment, the connecting device is size adjustable.

As used herein, the term "attach or hang from an overhead device" refers to utilizing the elongated device to attach to the hand mixer handle and then a convenient overhead device in order to hang the hand mixer in a bowl, or other container during mixing. The overhead device can be anything conveniently positioned over the hand mixer, but in one embodiment, it is the knob of a cabinet above the hand mixer as shown in FIG. 2.

DRAWINGS

Now referring to the drawings, FIG. 1 is a perspective view of the elongated device 1 of the present invention. In this view, a second end top connecting device 2 is designed to hang on an overhead device, such as a cabinet knob. The elongated device has a shaft 3, which connects to a first end connecting device 4 for attaching to the handle of a hand mixer. The shaft has telescoping lock 5 for changing the length of the shaft 3. The elongated device, in this embodiment, has a device for adjusting the size of the connecting means 6.

FIG. 2 is a perspective view of the elongated device 1 in use. The elongated device 1 is hanging over bowl 20. In this view, a second end top connecting device 2 is hanging from the knob 21 attached to cabinet 22. The first end connecting device 4 is attached to the handle 23 of the hand mixer 24, so that the hand mixer 24 can be utilized hands-free.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials, and the like apparent to those skilled in the art still fall within the scope of the invention as claimed by the applicant.

What is claimed is:

1. A system for making a hand mixer having a handle, hands-free consisting of:
    a) an overhead cabinet with a knob;
    b) an adjustable length elongated device having a first end attached to the handle of the hand mixer using a first end connecting device and;
    c) a second end attached to the cabinet knob using a connecting device for adjusting the size of the second end.

2. The system for making a hand mixer having a handle, hands-free according to claim 1, wherein the elongated device is attached to the handle of the mixer by the first end connecting device selected from the group consisting of a clip, loop, hook and loop fastener, adjustable loop, hooks, and tying.

3. The system for making a hand mixer having a handle, hands-free according to claim 2, wherein the second end connecting device attaches to the overhead cabinet by looping around the knob.

* * * * *